(12) United States Patent
Shankar et al.

(10) Patent No.: US 7,979,496 B2
(45) Date of Patent: *Jul. 12, 2011

(54) METHOD AND APPARATUS FOR MEASURING HEALTH AND PERFORMANCE OF A MESSAGING SYSTEM

(75) Inventors: Jagannathan Shiva Shankar, Bangalore (IN); Aruna K. Muvvala, San Jose, CA (US); Stephen Schleimer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 420 days.

This patent is subject to a terminal disclaimer.

(21) Appl. No.: 12/111,869

(22) Filed: Apr. 29, 2008

(65) Prior Publication Data

US 2008/0215696 A1  Sep. 4, 2008

Related U.S. Application Data

(63) Continuation of application No. 10/651,590, filed on Aug. 29, 2003, now Pat. No. 7,433,925.

(51) Int. Cl.
*G06F 15/16* (2006.01)
(52) U.S. Cl. ........ 709/206; 709/202; 709/203; 709/219; 709/229
(58) Field of Classification Search .................. 709/202, 709/203, 206, 219, 229
See application file for complete search history.

(56) References Cited

U.S. PATENT DOCUMENTS

| | | | |
|---|---|---|---|
| 5,734,698 A | 3/1998 | Kobayashi et al. | |
| 5,742,905 A | 4/1998 | Pepe et al. | |
| 6,370,120 B1 * | 4/2002 | Hardy | 370/252 |
| 6,434,222 B1 | 8/2002 | Shaffer et al. | |
| 6,446,114 B1 | 9/2002 | Bulfer et al. | |
| 6,449,646 B1 | 9/2002 | Sikora et al. | |
| 6,779,022 B1 | 8/2004 | Horstmann et al. | |
| 7,333,480 B1 | 2/2008 | Clarke et al. | |
| 2001/0047391 A1 | 11/2001 | Szutu | |
| 2002/0101453 A1 | 8/2002 | Nixon et al. | |
| 2002/0123328 A1 | 9/2002 | Snip et al. | |
| 2004/0141594 A1 | 7/2004 | Brunson et al. | |
| 2009/0030693 A1 * | 1/2009 | Shaffer et al. | 704/270 |
| 2010/0136965 A1 * | 6/2010 | Cheneau-Grehalle | 455/422.1 |

* cited by examiner

*Primary Examiner* — Mohamed Wasel
(74) *Attorney, Agent, or Firm* — Hickman Palermo Truong & Becker LLP

(57) ABSTRACT

Software agents perform a process to monitor the availability and/or performance of various functions of a messaging system. A call is initiated to an endpoint, where the endpoint is registered with a messaging system and is configured to forward incoming messages to the messaging system. A first agent transmits a message to the endpoint for forwarding to the messaging system. A second agent determines whether the endpoint receives a message notification. In an embodiment, the time that elapses between arrival of the message at the endpoint and reception of a message notification is determined. In an embodiment, if the second agent is able to retrieve the transmitted message, then the retrieved message is compared with the version of the original message that was received at the endpoint. Whether the retrieved message suffered any degradation from its path through the messaging system is determined based on the comparison.

37 Claims, 6 Drawing Sheets

METHOD AND APPARATUS FOR MEASURING HEALTH AND PERFORMANCE OF A MESSAGING SYSTEM

BENEFIT CLAIM

This application claims the benefit as a Continuation of prior application Ser. No. 10/651,590, filed Aug. 29, 2003 now U.S. Pat. No. 7,433,925, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to communication networks. The invention relates more specifically to a method and apparatus for measuring health and performance of a messaging system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet Protocol (IP) telephony is a technology that is being widely implemented and gaining widespread acceptance. Powerful applications that are enabling IP telephony and contributing to its popularity are unified communication systems, commonly referred to as Unified Messaging (UM) systems.

Unified Messaging Systems

UM systems enable users to receive e-mail, voice mail and fax messages in a uniform manner and to access them through a single interface. One example of a commercially available Unified Messaging system tool is Cisco Unity from Cisco Systems, Inc. of San Jose, Calif. Since UM systems are such a valuable tool, availability of a given UM system is business critical. Ideally, a UM system is constantly available for use.

IP-based UM system components are typically distributed across a network. Furthermore, such distributed systems commonly consist of a large number of components. Hence, a failure in the system is more probable as the number of components increases. Furthermore, isolation and diagnosis of system failures increase in difficulty as the number of components increases.

Management of Messaging Systems

Currently, SNMP (Simple Network Management Protocol) based tools are available for managing individual UM system components such as a centralized message store, a database server, or routers. A number of tools use SNMP, for example, to extract system information from various MIBs (Management Information Bases), and/or CMIP (Common Management Information Protocol) and/or HTTP, to monitor the status of a system. However, such tools provide for management of discrete parts of a system rather than for end-to-end management of the entire system. A key requirement from the perspective of a system manager or administrator is immediate acquisition of information regarding situations where an end user or business critical operation is affected. Existing tools do not readily facilitate identification and discrimination of issues that actually affect end users or business critical operations.

With respect to monitoring individual services and components, there are existing tools that monitor the services of UM systems. However, the known solutions are installed within the UM system, e.g., on the messaging server. Therefore, such tools are intrusive to the messaging system.

An example scenario is as follows. A specific digit pattern from an IP-PBX/PBX system exists to forward calls to a voice mail system. An administrator inadvertently deletes the pattern, which will cause all the call forwarding to the voice mail component to fail. Thus, users will not receive their voice mail, but existing system level tools are unable to identify the issue.

An example in which the system environment could be an issue is if the routes configured into a remote site gateway or router are modified. This could cause failures which would not be apparent when the health of the gateway or router is monitored. However, a user trying to retrieve voice mails from the system would most likely experience problems.

Another important attribute that administrator users often want to measure and monitor is the performance of the system, especially under load conditions. One simple metric that affects business users is the time it takes for a message notification indication such as a "Message Waiting" indicator, pager alert, phone call and the like, after a message is left. For example, a significantly long period between the leaving of a message and the related notification may indicate potential configuration issues or a system failure which affects an end user.

Based on the foregoing, there is a clear need for a technique for proactively monitoring the performance, health and functionality of a UM system and its environment. There is a further need for monitoring a UM system in a non-intrusive manner.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
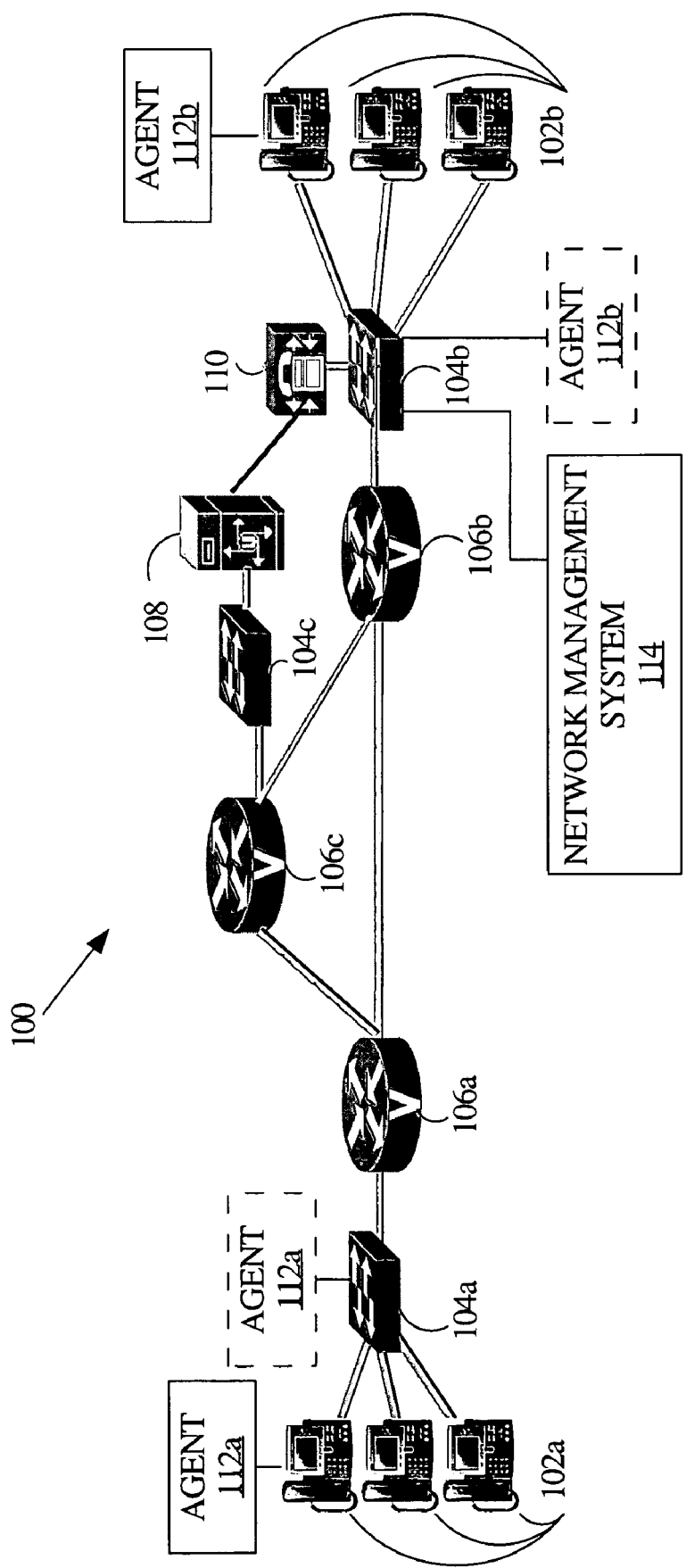
FIG. 1 is a block diagram of an example operating environment in which an embodiment may be implemented.

A method and apparatus for monitoring health and performance of a messaging system is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
   2.1 Operating Environment Example
3.0 Method for Measuring Health and Performance of a Messaging System
   3.1 Process For Monitoring a Messaging System
      3.1.1 Incremental System Feature Testing and Monitoring
      3.1.2 System Quality Testing and Monitoring
      3.1.3 Multicasting Testing and Monitoring
4.0 Implementation Mechanisms
   4.1 System Architecture
   4.2 Configuring a Synthetic Test
   4.3 Scheduling a Synthetic Test
   4.4 Synthetic Test Structure
   4.5 Test Scenario Definitions
   4.6 Phase Timing and Thresholds
   4.7 Query Mechanism
   4.8 Hardware Overview
5.0 Extensions and Alternatives 1.0 General Overview A process for monitoring a messaging system, such as a unified messaging system or a traditional voice mail system, is described. Agents acting as telephony endpoints are registered with a network. Such agents may be executing on telephone hardware or on a computing system, for example. A process is performed by two or more agents to monitor the availability and/or performance of a messaging system, such as a Unified Messaging (UM) system. For example, voice-mail, e-mail and/or facsimile functionality associated with the UM system may be exercised by the process to determine the "health" of such functionality.

A first agent initiates a call to an endpoint, where the endpoint is registered with a messaging system and is configured to forward incoming messages to the messaging system. The first agent transmits a message to the endpoint for forwarding to the messaging system. For example, a standard audio file may be transmitted by the first agent to the endpoint. A second agent that is associated with the endpoint then determines whether the endpoint receives a message notification in response to the transmitted message. Hence, the availability of at least a portion of the voice-mail component of the messaging system is determined. In an embodiment, the time that elapses between arrival of the message at the endpoint and reception of a message notification is determined, which provides a messaging system performance metric.

In an embodiment, the second agent attempts to access a message repository associated with the messaging system. For example, an attempt is made to access an "Inbox", "Mailbox", or the like, associated with the messaging system and with the endpoint. Hence, the health of additional functionality of the messaging system is monitored and determined. In an embodiment, upon accessing the repository the second agent attempts to retrieve the message from the repository. Again, the health of additional system functionality is thereby monitored and determined. For example, the second agent, through use of an e-mail client application, may attempt to retrieve the message from the messaging system as an e-mail message.

In embodiment, if the second agent is able to access the mailbox and retrieve the transmitted message, then functionality of the messaging system with respect to audio message processing is determined. Such determination is made by comparing the message retrieved from the messaging system with the version of the original message that was received at the endpoint. Whether the retrieved message suffered any degradation from its path through the messaging system is determined based on the comparison.

The described processes can be automatically performed at specified times or after specified intervals of time. Furthermore, no additional application or instrumentation is required on the messaging system being monitored. Therefore, the techniques for monitoring the functionality and performance of a messaging system are non-intrusive to the system. Synthetic testing approaches can be used.

2.0 Structural and Functional Overview 2.1 Operating Environment Example

FIG. 1 is a block diagram of an example operating environment 100 in which an embodiment may be implemented. A context that is used throughout this description for purposes of example is monitoring of a Unified Messaging system. However, use of the techniques described herein is not limited to use in such a context. Broadly, these techniques are applicable to any messaging system.

In environment 100, one or more phones 102a are communicatively coupled to one or more phones 102b through a series of network components constituting a network. For example, phones 102a, 102b are IP phones that communicate over a communications network, such as the public Internet or an enterprise LAN or WAN, using one or more IP telephony protocols. For another example, phones 102a, 102b are personal computers on which software executes to provide IP telephony services and functionality. Non-limiting examples of suitable communication protocols that are utilized by the phones 102a, 102b include ITU-T H.323, SIP (Session Initiation Protocol), MGCP (Media Gateway Control Protocol), SCCP (Signaling Connection Control Part).

The communications network may contain any number of network infrastructure elements including routers, switches, gateways, etc. For example, as illustrated in FIG. 1, the network that communicatively connects phone 102a to phone 102b includes gateways 104a, 104b and routers 106a, 106b, 106c. In one embodiment, the network is a TCP/IP network in which infrastructure elements execute a conventional routing protocol for routing packets among the infrastructure elements. Although embodiments are described herein with reference to the TCP/IP protocol, implementations are not limited to use of TCP/IP. Rather, other network communication protocols, including protocols that are not yet developed, may be used to implement these techniques.

Gateway 104c and messaging server 108, along with associated software, are generally referred to herein as a messaging system. At least the recipient telephony device, such as a phone 102b, is registered with the messaging system being tested, such as server 108. In an embodiment, the messaging system is a Unified Messaging system. One non-limiting example of a messaging server 108 is Cisco Unity from Cisco Systems, Inc. of San Jose, Calif. However, a messaging system does not typically operate in isolation. Hence, the availability and performance of a messaging system relies to a certain extent on surrounding network infrastructure.

In an implementation, environment 100 further comprises a call manager 110 for processing IP telephony calls. Hence, as illustrated in FIG. 1, phones 102b are served by call manager 110 and, therefore, are registered with call manager 110. One non-limiting example of a call manager 110 is Cisco CallManager from Cisco Systems. In an embodiment that includes a call manager 110, the call manager 110 has a routing pattern for the messaging server 108.

Various functions that are performed by the messaging system, as well as relevant network infrastructure elements, are monitored using the techniques described herein. An example of a scenario in which the present techniques are beneficial is as follows. Phones 102*a*, 102*b* register with a call manager 110, which is responsible for forwarding calls incoming to phone 102*b* based on specified rules. The forwarding process utilizes a logical link based on an appropriate protocol, such as SMDI (Simplified Message Desk Interface), IP, or any other PBX-voice mail integration. If the link between router 106*a* and 106*c* is failed and voice traffic is not configured to take the path of router 106*a*-106*b*-106*c*, then a phone 102*a* is unable to access the voice mail system. An administrator may be aware that the link from router 106*a* to 106*c* is down, perhaps through use of an SNMP-based management tool, but cannot readily deduce that access to voice mail is a problem. The techniques described herein provide for a determination that the voice mail system, or at least access thereto, is significantly affected by such a failed network link.

Another example of a scenario in which the present techniques are beneficial is as follows. Suppose an access list on router 106*a* is configured to block RTP (Real-Time Transport Protocol) messages. This is a valid situation, however, phones 102*a* will no longer be able to fully functionally communicate with the messaging server 108 because the phones use RTP for such communications. The techniques described herein provide for a determination that the messaging system is unavailable to the phones in such a configuration.

The techniques described herein are implemented using agents, such as a first agent 112*a* and a second agent 112*b*. Agents 112*a*, 112*b* may be referred to as "synthetic phones" because they comprise software which behaves like an actual hardware phone. However, one feature of such a synthetic phone is that it is capable of initiating and receiving calls at specified intervals. An administrator, for example, can specify such intervals.

As illustrated in FIG. 1, agents 112*a*, 112*b* may execute on hardware elements from which perspective a messaging system is monitored. For example, agent 112*a* may be software that runs on a phone 102*a* and which can monitor the functionality of the messaging system with respect to the phone 102*a*. Agent 112*a* is able to determine whether the health and performance of the messaging system affects the phone 102*a*. Each of phones 102*a* may be configured with similar agents 112*a*. In an alternative embodiment, an agent 112*a* (depicted as a dashed component in FIG. 1) may be configured on gateway 104*a*, which serves all of phones 102*a*. Similarly, agent 112*b* may be configured on each of phones 102*b* or on gateway 104*b*, which serves all of phones 102*b*. Agents 112*a* and 112*b* intercommunicate and function as agents to phones 102*a* and 102*b*, respectively, to monitor the health, availability and performance of a messaging system with respect to phones 102*a* and 102*b* and the possible impact on users of phones 102*a*, 102*b*. Communication processes between agents 112*a* and 112*b* are described below.

Environment 100 may comprise optional network management system 114. As illustrated, such a software tool may be implemented to execute on gateway 104*b*, for example. However, the component on which it executes is not important and may vary from implementation to implementation. Network management system 114 can be a known tool used for managing network elements such as routers, gateways, gatekeepers, servers and the like. A suitable network management system is Cisco IP Telephony Environment Monitor from Cisco Systems. The presence of a network management system 114 is not critical to implementation of the techniques described herein. However, information obtained by a network management tool, such as from MIBs, may be correlated with information obtained by agents 112*a*, 112*b* to isolate and diagnose network and/or messaging system faults. Furthermore, information or results from agents 112*a*, 112*b* may be integrated with and displayed with results from network management system 114, for example, as part of a fault management system user interface associated with network management system 114.

Figure 2A:
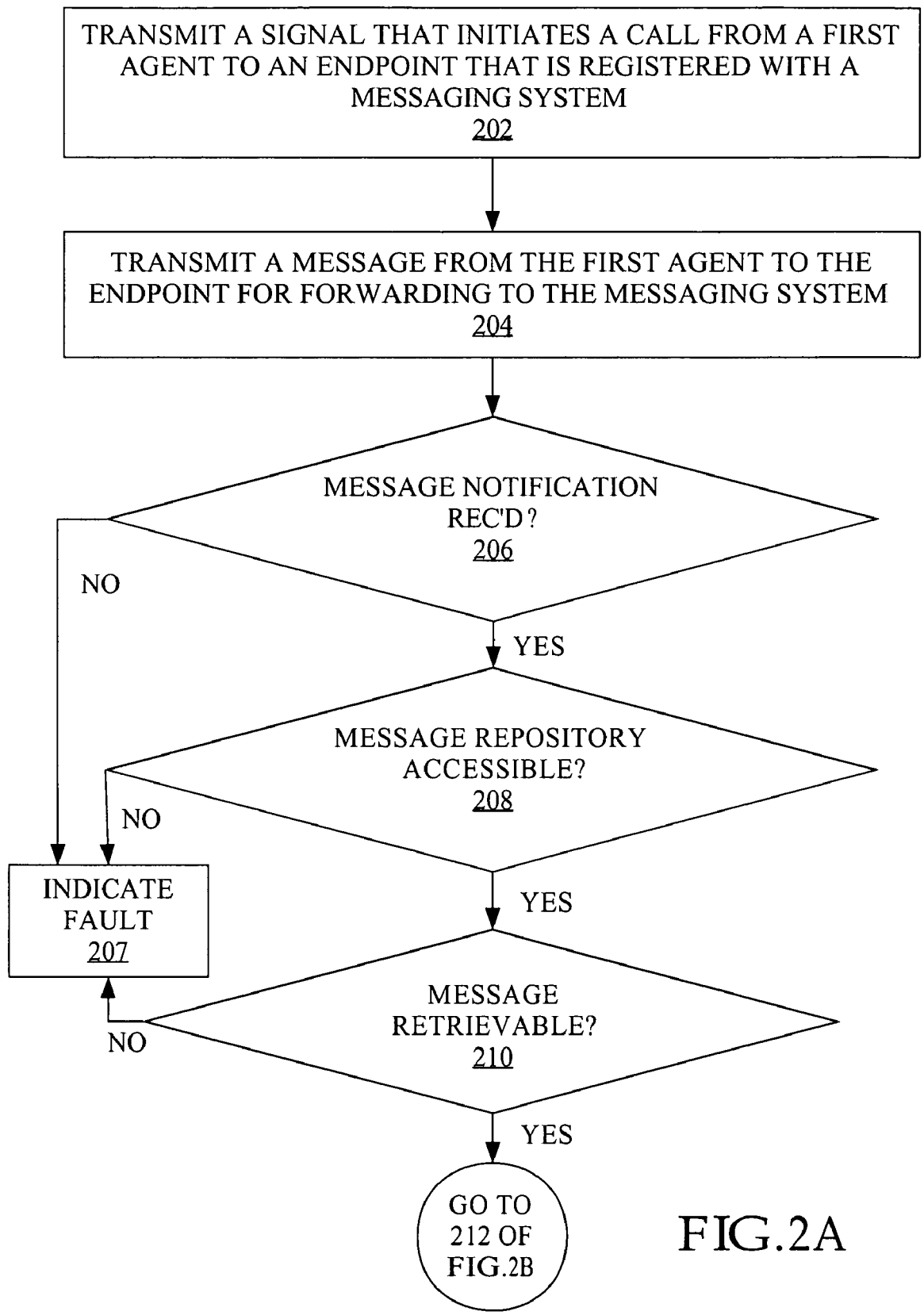
FIG. 2A is a flow diagram that illustrates a process for monitoring a messaging system.
Figure 2B:
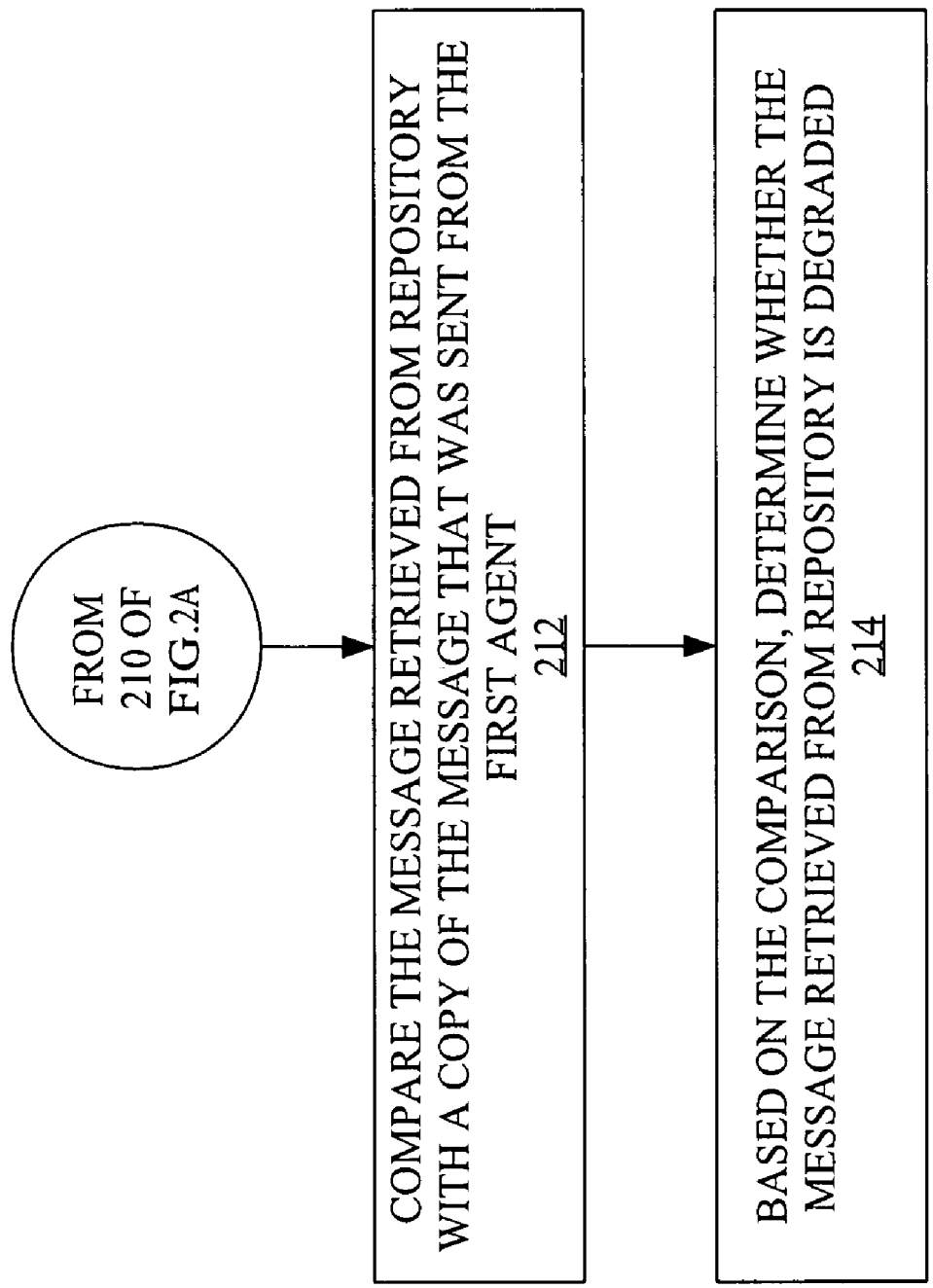
FIG. 2B is a flow diagram that illustrates a continuation of a process for monitoring a messaging system as illustrated in FIG. 2A.

3.0 Method for Measuring Health and Performance of a Messaging System 3.1 Process for Monitoring a Messaging System FIG. 2A and FIG. 2B are flow diagrams that illustrate a process for monitoring a messaging system. According to an embodiment, agents 112*a* and agents 112*b* are participants in execution of the process illustrated in FIGS. 2A and 2B. However, embodiments may differentiate the performance of one agent from the performance of another agent. Furthermore, all of the blocks described in reference to FIGS. 2A and 2B are not required to use embodiments of the invention.

A synthetic transaction or synthetic test, such as illustrated in FIGS. 2A and 2B, relies on a test configuration that includes the MAC address of the caller, the MAC address and phone number of the recipient, and the user name and password associated with the recipient's voice mail service provided by the messaging system.

3.1.1 Incremental System Feature Testing and Monitoring

At block 202, a signal is transmitted, which initiates a call from a first agent to an endpoint that is registered with a messaging system. For example, agent 112*a* places a call to a specific phone 102*b*, which is registered with messaging server 108 and avails itself of the functionality provided by messaging server 108. However, the signal transmitted at block 202 may be transmitted by an entity other than agent 112*a*.

In an embodiment, agent 112*a* and agent 112*b* are registered as telephony endpoints on a network, such as the Internet. Hence, the agents are configured to communicate using suitable telephony protocols and recognized by other network elements as telephony endpoints. In an implementation, phones 112*b* and perhaps phones 112*a* are registered with a call manager such as call manager 110.

Agent 112*b* acts as an agent or proxy for the phone 102*b*, but may be configured with a different network address than the phone 102*b*. Alternatively, agent 112*b* and phone 102*b* may be configured with the same network address, however, agent 112*b* may receive calls to phone 102*b* on a specified port of phone 102*b*. Regardless of the configuration, in this description, a call from agent 112*a* to phone 102*b* is the same as a call from agent 112*a* to agent 112*b*. Agent 112*b* "stands in" for phone 102*b* and, therefore, in the process described, transmissions to an endpoint refers to transmissions to phone 102*b* which are "intercepted" and processed by agent 112*b*. Agent 112*b* is configured to forward incoming calls to messaging server 108.

At block 204, a message is transmitted from agent 112*a* to the phone 102*b*. Use of the term "message" is not intended to limit the message sent at block 204 to any specific type of message using any specific protocol, unless otherwise indicated. Agent 112*b* acting as proxy for phone 102*b* does not answer the incoming call, therefore, the call is supposed to be forwarded to the messaging system pursuant to a configuration associated with agent 112*b*. For example, a call manager such as call manager 110 forwards the message to messaging server 108. In an embodiment, the message transmitted at block 204 is an encoded audio message. For example, a prerecorded wav (.wav) file or some other well-known format of audio file is encoded according to a G.711 scheme and transmitted to the endpoint.

The techniques described herein can be further used to exercise and monitor a Unified Messaging system in relation to e-mail and facsimile processing. One feature that is modified with respect to this process is the nature of the message transmitted. Hence, in one embodiment, the message transmitted at block 204 is an e-mail message, thus facilitating testing and monitoring of the messaging system in relation to receiving, processing, storing, presenting and making available e-mails. In another embodiment, the message transmitted at block 204 is a facsimile message, thus facilitating testing and monitoring of the messaging system in relation to receiving, processing and storing, presenting and making available facsimiles. Through modification of the message, the general techniques described can be further modified to test and monitor other features provided by a messaging system that is being monitored. Therefore, the invention is not limited to those specific embodiments and features described.

In an embodiment, blocks 202 and 204 are performed over a packet-switched network. For example, the transmissions may utilize TCP/IP over the Internet.

At block 206, it is determined by the receiving agent, agent 112b, whether a message notification is received at phone 102b in response to the forwarded message. Generally, the portion of the process described to this point monitors and tests whether the messaging system properly provides an indication to a user of the phone 102b that a message has been received, processed and stored at or in conjunction with messaging server 108. If a failure is encountered, such as no message indication is received, then a fault is indicated at block 207. For fault isolation, in response to the fault indication an administrator may optionally correlate such fault indication with information from network management system 114 or call manager 110 to determine whether the call forwarding mechanism of call manager 110 properly forwarded the message to the messaging server 108.

The techniques described herein can be further used to exercise and monitor a messaging system in relation to message indication processing. Thus, in one embodiment the message indication is an e-mail message. In another embodiment, the message indication is a pager message. These embodiments are beneficial in testing various functionality specific to various features of the messaging system. As the types of message indications used by various messaging systems may vary, and may evolve in the future, the general techniques also may vary in order to test and monitor specific features of such systems. The process of FIG. 2A can be further modified to test and monitor other features provided by a messaging system.

In an embodiment, if a message notification is received, then it is determined how long it took between arrival of the message at the endpoint and reception of the message notification at the endpoint. Any conventional timing mechanism may be implemented to time such events. A message system performance metric is thereby provided.

In an embodiment, if a message notification is received, then the agent 112b attempts to access a message repository associated with the messaging system. For example, agent 112b attempts to access the messaging system mailbox associated with the phone 102b. At block 208, it is determined whether the message repository is accessible. If it is not accessible, then a fault is indicated at block 207. Generally, this portion of the process monitors and tests whether the messaging system properly received, processed, stored and made available the forwarded message associated with the phone 102b. In response to the fault indication an administrator may optionally correlate such fault indication with information from network management system 114 in an attempt to determine where the actual fault lies in relation to accessing the messaging system mailbox associated with the phone 102b.

In an embodiment, if the message repository is accessible, then the agent 112b attempts to retrieve the message from the message repository associated with the messaging system. For example, agent 112b attempts to retrieve the voice mail or any other form of message that is accessible via the messaging system mailbox associated with the phone 102b. At block 210, it is determined whether the message is retrievable from the message repository associated with the messaging system and with phone 102b. If it is not retrievable, then a fault is indicated at block 207. For example, an administrator may be notified of a fault via an e-mail or pager message. For another example, one may be notified of a fault through a GUI. In an embodiment, fault indications include an indication of one or more probable causes for the fault, as described in more detail below in reference to implementation mechanisms.

Generally, this portion of the process monitors and tests whether the messaging system properly received, processed, stored and made available the forwarded message associated with the phone 102b. In response to the fault indication an administrator may optionally correlate such fault indication with information from network management system 114 in an attempt to determine where the actual fault lies in relation to retrieving a message from the messaging system mailbox.

In an embodiment, if a message notification is received, agent 112b deletes the message. For example, agent 112b may navigate an interface to messaging server 108 to avail of a message delete function. Agent 112b further monitors the time it takes for the message indication to disappear, which again exercises and monitors the performance of the messaging system, and provides a related performance metric.

Unified Messaging systems typically provide access to various forms of messages, such as voice mail, e-mail and fax, via a common user interface. For example, a UM system may include a client-side application that includes a user interface for accessing the system and retrieving messages in multiple formats. Furthermore, such a system may convert various types of incoming messages, such as voice mail and fax, into e-mails. In an embodiment in which a UM system is being monitored, agent 112b attempts to retrieve the message as an e-mail from the message repository. Using the client-side interface to retrieve the message as an e-mail exercises features of the messaging system related to processing, presenting and making available messages that arrive in a non-e-mail format and which are converted to and presented as e-mails by the messaging system.

In an embodiment, upon retrieving the message from the repository, agent 112b plays the message. For example, the client-side interface is used to retrieve and play an audio message from the UM system, which tests the functionality of the system relating to receiving, processing, storing and making available incoming audio messages.

3.1.2 System Quality Testing and Monitoring

In another embodiment, upon retrieving the message from the repository, the retrieved version of the message is compared with an original copy of the message that was originally sent to the endpoint from the sender, at block 212. For example, both agents 112a, 112b have access to a copy of a common wav file. Agent 112b retrieves the voice mail message, such as a wav file, from the messaging system and compares that with a stored copy of the message, such as a copy of the wav file. Hence, two different versions of the same audio message are compared. Based on such comparison, it is determined at block 214 whether the message retrieved from the repository is degraded in quality from the message that was sent by the sender. A valuable audio processing and quality metric associated with the messaging system is thereby provided.

In an embodiment, agent 112b retrieves the voice mail message, such as the wav file, from the messaging system and compares that to a version of the message that was received at the endpoint. For example, agent 112b may intercept the sent message prior to or concurrent with its reception at messaging server 108 and compare that message with the message retrieved from the messaging repository to determine whether the message suffered any degradation in its path through the messaging system.

Algorithms and processes used to compare the audio messages or audio files can vary from implementation to implementation. Several references are provided as non-limiting examples of existing technologies that can be implemented into the process of FIG. 2B, to perform blocks 212 and 214. In addition, such technologies may be used to further determine, perhaps in conjunction with a network management system 114, why the message is degraded, if applicable. For example, analysis may determine that there was a codec mismatch or a failure in transcoding.

The following references, available as Recommendations from the ITU-T, are incorporated by reference for all purposes as if fully disclosed herein:

P.800, Methods for Subjective Determination of Transmission Quality;
P.800.1, Mean Opinion Score (MOS) Technology;
P.861, Objective Quality Measurement of Telephone-Band (300-3400 Hz) Speech Codecs
P.862, Perceptual Evaluation of Speech Quality (PESQ), An Objective Method for End-to-End Speech Quality Assessment of Narrowband Telephone Networks and Speech Codecs;
P910, Subjective Video Quality Assessment Methods for Multimedia Applications;
P.911, Subjective Audiovisual Quality Assessment Methods for Multimedia Applications.

3.1.3 Multicasting Testing and Monitoring

In an embodiment, blocks 202 and 204 include multicasting a signal and multicasting a message to a plurality of endpoints on a network. For example, agent 112a may multicast such signals to the plurality of endpoints, such as phones 102b, with agent 112b monitoring the messaging systems reaction and performance with respect to the multicast message. Additional analysis of the quality of messages associated with different endpoints which are retrieved from the messaging system, such as with the process of FIG. 2B, may be implemented to further determine the health of relevant features of the system and to diagnose any faults indicated by the system.

For another example, if the messaging system includes multicasting functionality whereby a single message is transmitted to the messaging server 108 for multicasting to multiple endpoints, monitoring the multicasting process through an implementation of the techniques described provides valuable information about the health of the system's multicasting functionality. Thus, the general processes of FIGS. 2A and 2B can be extended to test and monitor the availability, performance and quality of advanced features, such as multicasting.

In summary, a technique is provided for monitoring a messaging system. Such monitoring can be implemented as incremental testing of features that comprise a feature set offered by a messaging system, as illustrated in FIGS. 2A and 2B. The technique determines the health of a messaging system, such as a Unified Messaging system, as well as the network infrastructure that lies between an end user and the messaging system. Hence, faults that actually affect an end user are identified in a proactive, non-intrusive manner to the messaging system. No additional instrumentation is needed on the messaging server to benefit from these techniques.

4.0 Implementation Mechanisms

The following implementation mechanisms are non-limiting examples, which are related to a specific implementation. However, details may vary from implementation to implementation. Hence, the following sections are not to be construed to limit use of embodiments of the invention.

4.1 System Architecture

Figure 3A:
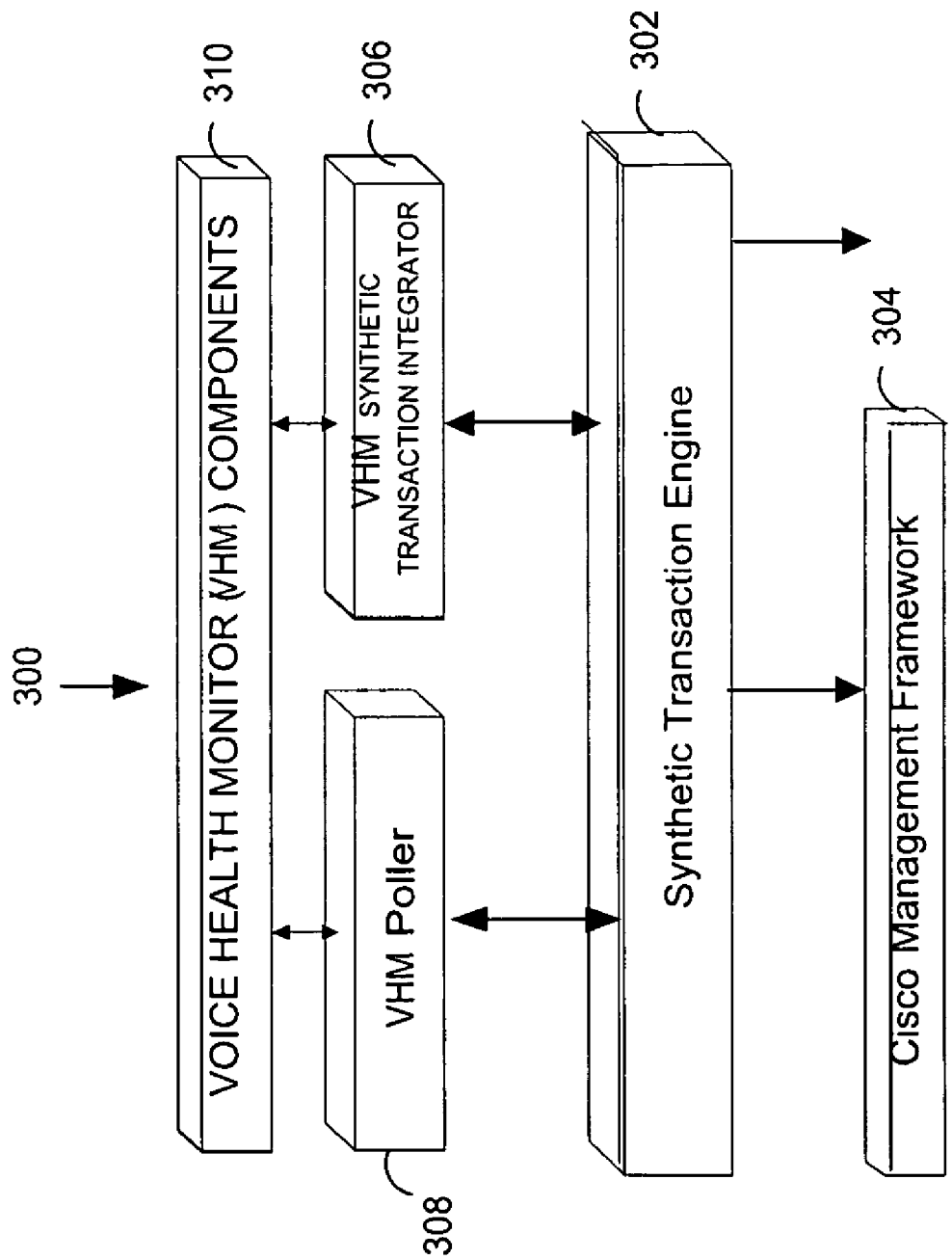
FIG. 3A is a block diagram that illustrates an example system architecture for a synthetic test engine with which an embodiment of the invention may be implemented.

FIG. 3A is a block diagram that illustrates an example system architecture 300 for a synthetic test engine with which an embodiment of the invention may be implemented. FIG. 3 illustrates one possible system architecture with which embodiments may be implemented; however, architectures may vary from implementation to implementation.

Architecture 300 comprises a Synthetic Test Engine (STE) 302 as a backend component that may use the Cisco Management Framework (CMF) 304 base services for database access, SNMP and process management. However, STE 302 may function independently of the CMF 304. Further, in architecture 300, STE 302 communicates with a Voice Health Monitor (VHM) application frontend. The STE 302 is installed on a device such as phones 102a, 102b (FIG. 1). STE 304 registers with a daemon manager and runs as a service on the device.

A Voice Health Monitor (VHM) Synthetic Test (ST) Integrator 306 uses the Common Information Model (CIM) over HTTP protocol to communicate with the STE 302 to create, modify and delete tests, such as synthetic tests performed by agents 112a, 112b (FIG. 1). CIM is an object-oriented information model defined by the Distributed Management Task Force (DMTF) and which provides a conceptual framework for describing management data. VHM Poller 308 retrieves the results of the synthetic tests from STE 302. Such results, as well as configuration parameters, are displayed in a VHM GUI 310.

An example of a process of deployment of agent 112a, 112b on a network device may be as follows. An agent 112a, 112b is installed on a device, such as phones 102a, 102b or call manager 110. A set of MAC (Media Access Control) addresses are added to the call manager 110 in association with phones 102a, 102b. The MAC addresses can be used to configure tests, or synthetic transactions, in a system such as VHM. The first set of results from a test, such as the processes of FIG. 2A and FIG. 2B, can be monitored to ensure a proper test configuration. Further, test parameter thresholds and associated fault indications, alerts and notifications are configured so that an administrator is notified upon a failure of a monitored messaging system.

4.2 Configuring a Synthetic Test

Figure 3B:
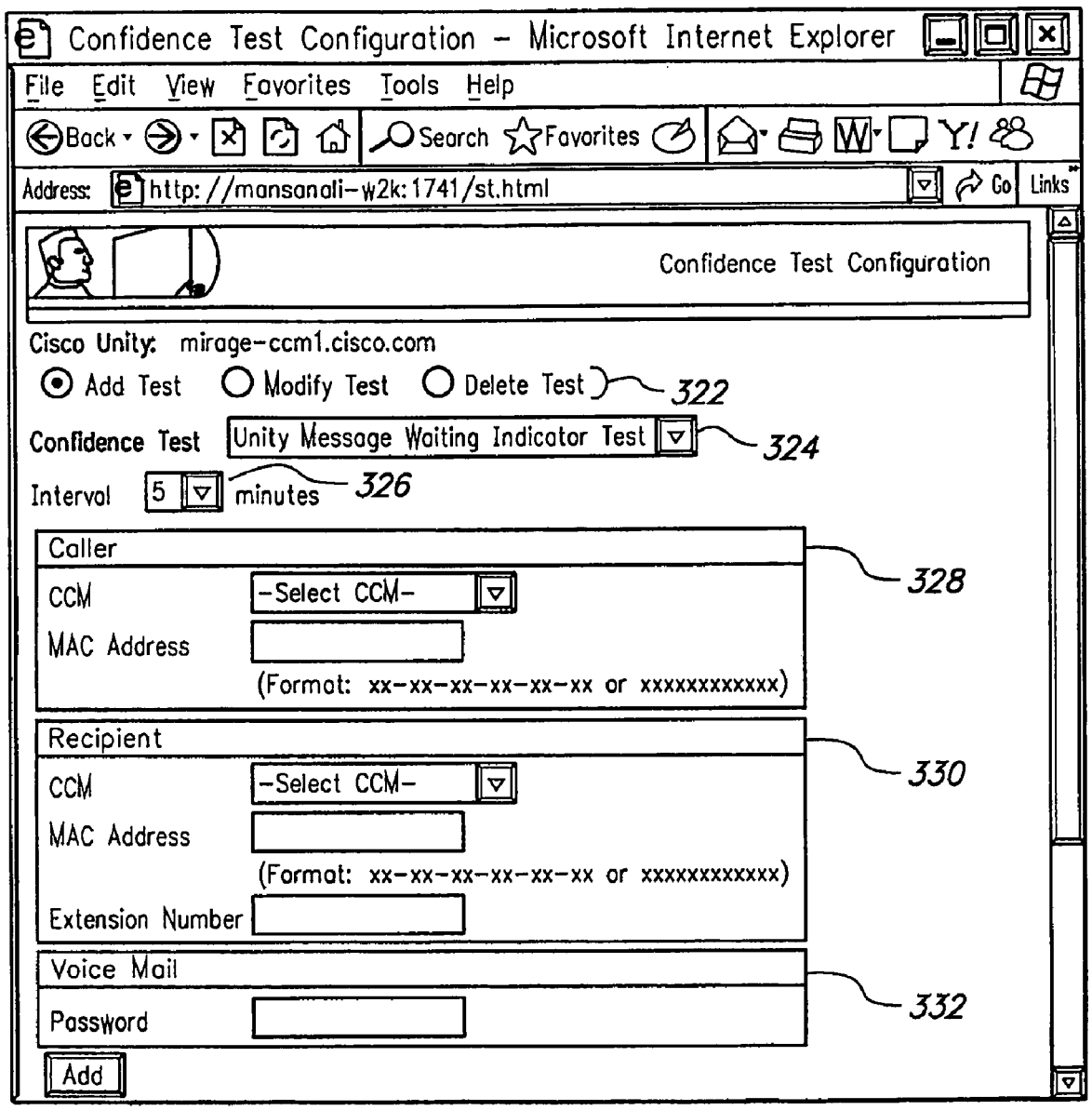
FIG. 3B is an example of a screenshot with which synthetic tests may be configured.

FIG. 3B is an example of a screenshot, or GUI, with which synthetic tests may be configured, such as for the Cisco Unity application. The screen illustrated in FIG. 3B can be used to create new tests as well as to modify and delete existing tests, as depicted by the choice of operations 322. Confidence Test field 324 or menu provides an interface to choose or specify a type of existing test, such as a Message Waiting Indicator Test. Interval field 326 provides an interface to choose or specify a periodic interval after which to run the chosen test.

Caller frame 328 provides an interface through which a call manager, such as call manager 110 (FIG. 1), or telephony device, such as phone 102a, 102b, is specified as the calling device. For example, the MAC address associated with agent 112a is configured as the caller in a synthetic transaction, such as the process of FIG. 2A, in a field of caller frame 328. Similarly, Recipient frame 330 provides an interface through which a call manager or telephony device is specified as the receiving device. For example, the MAC address associated with agent 112b is configured as the call recipient in a synthetic transaction in a field of recipient frame 330. Password frame 332 includes a field for entry of a voice mail password. An administrator can use password frame 332 to enter the appropriate password to access voice mail from the messaging server 108 for a given recipient. Hence, agent 112b is able to exercise the voice mail capabilities of messaging server 108.

According to one embodiment, a specific synthetic test is configured to test an emergency responder service or mechanism associated with a messaging server, which are frequently offered in an enterprise environment. STE 302 sets up an end-to-end call from the source synthetic phone to the emergency number (this will be the target number for the end-to-end calls) and monitors the PSAP (Public Safety Answering Point) and the OSAN (On Site Alert Number) for an incoming call. Monitoring of the OSAN is optional as some enterprises may choose not to support an OSAN in their campus. In addition, the PSAP and the OSAN can be registered to different call managers.

The following process is an example of such a test:
(1) setup an end-to-end call from source synthetic phone to emergency number;
(2) setup an incoming call on the PSAP;
(3) setup an incoming call on the OSAN.

The parameters for the test are source synthetic phone MAC address, source call manager, emergency number, PSAP MAC address, PSAP call manager, OSAN MAC address, OSAN call manager, and interval. An interface similar to the GUI shown in FIG. 3B may be used to configure such a test of an emergency responder service, with fields for the PSAP and OSAN call managers and MAC address instead of the recipient frame 330.

4.3 Scheduling a Synthetic Test

STE 302 is a framework that runs the tests to determine the health of the messaging application. In an embodiment, STE 302 runs tests at periodic intervals (60 s, 120 s, 180 s etc), using the ANI concept of a Time base. A time base defines a unit of work that is executed at the predefined interval. For example, a 60 second time base runs every 60 seconds. When a test is created it is placed in the appropriate Time base based on the frequency at which it needs to run.

In some implementations, there may be a requirement to be able to stop tests from running during maintenance periods on the call manger 110 (FIG. 1), and times when rediscovery, backup or any other CPU intensive operations are happening on the messaging server 108 (FIG. 1) causing spurious one time failures. STE 302 provides a mechanism to provide a schedule for tests to run, whereby tests can be stopped and started at scheduled times.

The STE 302 handles the scheduling completely in the backend and stores the schedule persistently in a database. VHM does not store the schedule on its own, but simply fetches the schedule from STE 302 for display to a user and sets the schedule when the user applies a new schedule. VHM will use the extrinsic methods exposed by STE 302 to get and modify test schedules.

4.4 Synthetic Test Structure

As an application monitor, the STE 302 is able to connect to remote endpoints to be able to perform tests. Further, STE 302 needs the corresponding credentials to access the remote application. In an embodiment, a RemotePortAccessor object provides access to a remote application, such as messaging server 108 (FIG. 1).

STE 302 is able to determine what tests are to be performed on a particular type of application. This is a definition of the test suite for an application, which, in an embodiment, is provided by the CiscoMonitorTestDefinition object. Once the test definition is available, the next step is to build a set of test cases for a monitored application. STE 302 accepts a test definition as input and installs all the test cases for a particular instance of a monitored application. In an embodiment, the set of test definitions is constructed by a Monitor object. A Testcase object binds a test definition and the specific values for an instance, which can be used for execution. The test definition defines and provides the "machinery" while the values provide the "fuel" to run a test.

A test case has one or more phases it goes through before completion of the Test case. A phase is a logical entity that is the basic unit of reuse within STE 302. For example, an End-To-End call test requires a registration phase and so does a phone registration test. Thus, it is possible for these test cases to reuse the registration phase definition. Sets of parameters that are passed in during a phase, such as the MAC address of a phone during the registration, are associated with a phase. It is also possible for parameters to be passed in as placeholders that will be filled in during the execution, refereed to as passing a reference.

A phase has one or more steps called cycles. A cycle is the basic unit of execution. An example of cycles is in the Off-Hook phase where one cycle would be to go offhook and check for the off hook indication while the second cycle would be to check for other messages such as dial tone, or to display text following the offhook event. When a cycle is being executed, the test may be required to answer certain prompts. In addition the success of a step may be based on some responses in the previous steps. This is encapsulated in three objects associated with a cycle which, in an implementation, are CyclePrompt, CycleReplyMustExist and CycleReplyMustNotExist. The CyclePrompt object encapsulates the evaluation of prompts and responses to the prompts. The CycleReplyMustExist object has the list of one or more responses that must be present to declare the success of the step. The CycleReplyMustNotExist object is a list of prompts which, if present, indicates that the test has failed for a known reason. The responses are always evaluated first with the ReplyMustNotExist and then with the ReplyMustExist list. Thus, there is clarity in defining the responses so that they do not overlap.

Now that all the static definitions have been established, a component that actually executes these test cases, phases and cycles is described. An accessor object establishes the physical connection to the monitored application using the RemotePortAccessor defined, and then executes the cycle in a phase evaluating the prompts, ReplyMustExist and ReplyMustNotExist. The monitor starts the execution by invoking the execution of each of the phases in order. The phases in turn execute the contained cycles. The cycle uses the accessor to actually perform the execution and for evaluation of the test.

4.5 Test Scenario Definitions

When VHM needs to configure an End-To-End Call between two synthetic phones it needs to create two test cases. One is an End-to-End call test case that takes the source phone MAC and the destination phone call manager address or phone number and extension. The second is an incoming call with the extension and MAC address that matches the parameters in the end-to-end call destination. This necessitates synchronization regarding configuration and timing.

In an implementation, STE 302 provides Test Scenario definitions that combine the Test cases and their parameters to define high-level test cases. Test Scenario introduces a notion of a higher level test that gets scheduled. The constituent tests are started by a Metatest. An internal dependency mechanism ensures that Test Scenario executes the constituent tests based on the successful completion of a phase of another test. Thus, synchronization issues are avoided.

Inputs to such a Metatest case includes parameters already needed for the End-to-End call test and the incoming call test. Examples of such parameters include (1) MAC address, (2) call manager address, (3) phone type (default: 7960), and (4) time off hook (default: 3000 ms for source, 2500 ms for destination) for both the source phone and destination phone, and the destination phone number. Outputs from the Test Scenario are derived from the outputs from the individual tests in the following manner:

TestStatus=success if all constituent tests succeed, failure otherwise;

Response time=maximum time of all constituent tests;

TestResults=the set of test results from failing tests;

ProbableCause=the set of probable causes from all failed constituent tests.

When a failure occurs in a test it becomes important for the user to know the reason for a particular test failing. One important aspect is to differentiate between the failure due to a problem in the messaging system under test and a problem with the configuration parameters of the test. A probable cause field is provided in the TestResults, which lists the probable reasons a particular test is failing.

4.6 Phase Timing and Thresholds

The ability to provide timing for various phases in a call is provided. For example, a useful metric of performance is the time between Offhook and dial tone or time between when a message was left on the messaging server 108 (FIG. 1) to the time when the Message Waiting Indicator (MWI) comes on. STE 302 provides, as a part of the results to VHM, an array of phase timings for each of the phases in a test. VHM is able to setup a threshold value for the various phases. When this threshold value is exceeded during test execution, an event is generated indicating which phases of the tests violated the thresholds.

The phase timings are received by VHM and get displayed in DDV (Device Detail View). In an implementation, there is one threshold value exposed to the user called 'MWI On Time Threshold". The user configures this value using the PTM (Polling and Threshold Manager) UI. VHM compares the phase timing value with the configured threshold value and if the value exceeds the configured threshold value, then VHM generates an alert (MWIOnTimeExceeded) which will be shown in AFD (Active Fault Display). In an implementation, allowed values for this threshold setting is 5 seconds to 4 minutes.

4.7 Query Mechanism

In an implementation, the polling of the test results will be triggered by the event from STE 302. The event com.cisco.nm.ama.AmaTestCaseStatusNotification from STE 302 will contain the test ids, result ids and status. Upon receiving this event, VHM will query the result details if required (in case the test fails) from STE 302 for only the results received in the event payload. Hence, the polling is event-based and unnecessary polling is avoided. For example, if a test is running only every 5 minutes, then the polling for that test's result will happen only every 5 minutes.

4.8 Hardware Overview

Figure 4:
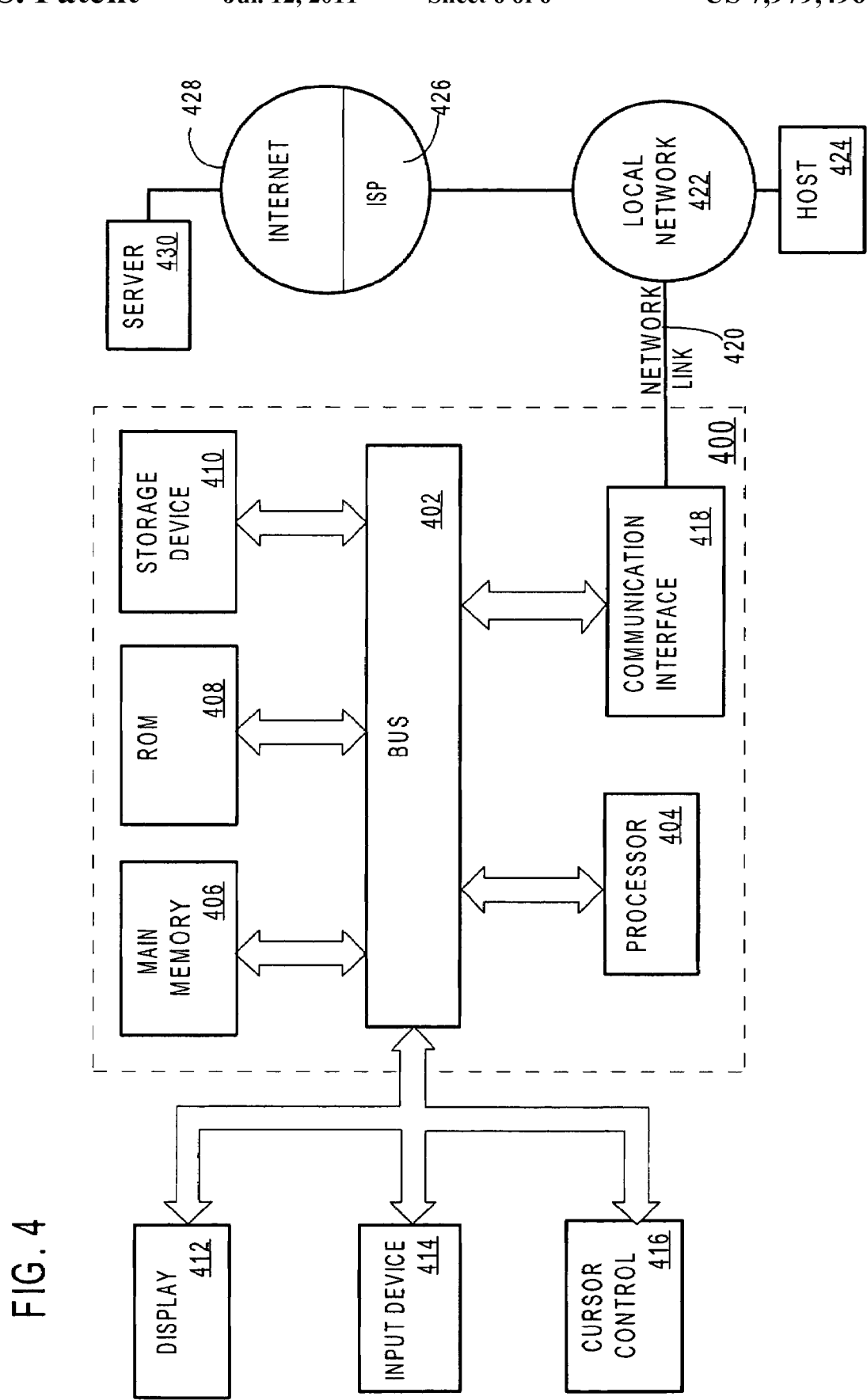
FIG. 4 is a block diagram that illustrates a computer system upon which an embodiment may be implemented.

FIG. 4 is a block diagram that illustrates a computer system 400 upon which an embodiment of the invention may be implemented. One embodiment is implemented using one or more computer programs running on a network element such as a router device or gateway device. Thus, according to that embodiment, the computer system 400 is a router or gateway. One embodiment is implemented using one or more computer programs running on a telephone device. Thus, according to that embodiment, the computer system 400 is a telephone.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for monitoring a messaging system. According to one embodiment of the invention, message system monitoring is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the techniques and functions that are described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, although embodiments of the invention are described primarily in reference to IP telephony, the techniques are applicable to the PSTN and traditional voice mail systems. For another example, although embodiments of the invention are described primarily in reference to an audio message to test and monitor incremental features associated with a voice mail feature set offered by a messaging system, the process is further applicable to multimedia forms of messages. For example, the processes may be implemented to monitor a messaging systems functionality regarding video transmissions, audiovisual transmissions and other forms of multimedia.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A data processing system comprising:
   one or more processors;
   a computer-readable volatile or non-volatile medium coupled to the one or more processors and storing one or more sequences of instructions which when executed by the one or more processors cause:
   receiving at an endpoint in a network, a message from a first agent acting as proxy for an Internet Protocol (IP) phone;
   forwarding the message to a unified messaging system;
   creating and storing at the endpoint, a copy of the message;
   in response to receiving a message notification at the endpoint from the messaging system, accessing a message repository of the messaging system and retrieving the message from the message repository;
   comparing the message retrieved from the message repository with the copy of the message; and
   based on the comparing, determining whether the message retrieved from the message repository is degraded in quality.

2. The system of claim 1, wherein the computer-readable volatile or non-volatile medium further comprises instructions which when executed cause determining how much time elapses between arrival of the message at the endpoint and activation of a message waiting indicator at the phone.

3. The system of claim 1, wherein the message is an audio message and wherein the computer-readable volatile or non-volatile medium further comprises instructions which when executed cause playing the message using an interface to the messaging system, upon retrieving the message.

4. The system of claim 1, wherein the computer-readable volatile or non-volatile medium further comprises instructions which when executed cause determining why the message retrieved from the repository is degraded.

5. The system of claim 1, wherein the message is any of an audio message, an e-mail message, and a facsimile message.

6. The system of claim 1, wherein the computer-readable volatile or non-volatile medium further comprises instructions which when executed cause multicasting the message to a plurality of telephony endpoints on a network, and determining, by each of a plurality of agents that are each associated with a respective endpoint of the plurality of endpoints, whether the associated endpoint receives a message notification in response to the message.

7. The system of claim 1, wherein the computer-readable volatile or non-volatile medium further comprises instructions which when executed cause testing whether the message notification is received at the endpoint from the messaging system in response to the forwarding, and generating a fault indication when the message notification is not received at the endpoint.

8. The system of claim 7, wherein the computer-readable volatile or non-volatile medium further comprises instructions which when executed cause correlating the fault indication to information from a network management system to determine whether a call manager to which the phone is coupled properly forwarded the message to the messaging server.

9. The system of claim 1, wherein the computer-readable volatile or non-volatile medium further comprises instructions which when executed cause testing, in response to the retrieving, whether the messaging system properly received, processed, stored and made available the forwarded message associated with the phone, and generating a fault indication when the message cannot be retrieved.

10. The system of claim 9, wherein the computer-readable volatile or non-volatile medium further comprises instructions which when executed cause correlating the fault indication to information from a network management system.

11. The system of claim 1, wherein the computer-readable volatile or non-volatile medium further comprises instructions which when executed cause correlating the fault indication to information from a network management system to determine whether a call manager to which the phone is coupled properly forwarded the message to the messaging server.

12. The system of claim 1, wherein the computer-readable volatile or non-volatile medium further comprises instructions which when executed cause requesting the messaging system to delete the message, and determining a time elapsed between requesting the messaging system to delete the message and when a message indication at the phone disappears.

13. A computer-implemented method comprising:
receiving at an endpoint in a network, a message from a first agent acting as proxy for an Internet Protocol phone;
forwarding the message to a unified messaging system;
creating and storing at the endpoint, a copy of the message;
in response to receiving a message notification at the endpoint from the messaging system, accessing a message repository of the messaging system and retrieving the message from the message repository;
comparing the message retrieved from the message repository with the copy of the message; and
based on the comparing, determining whether the message retrieved from the message repository is degraded in quality.

14. The method of claim 13, wherein the message is any of an audio message, an e-mail message, and a facsimile message.

15. The method of claim 13, further comprising testing whether the message notification is received at the endpoint from the messaging system in response to the forwarding, and generating a fault indication when the message notification is not received at the endpoint.

16. The method of claim 15, further comprising correlating the fault indication to information from a network management system to determine whether a call manager to which the phone is coupled properly forwarded the message to the messaging server.

17. The method of claim 13, further comprising testing, in response to the retrieving, whether the messaging system properly received, processed, stored and made available the forwarded message associated with the phone, and generating a fault indication when the message cannot be retrieved.

18. The method of claim 17, further comprising instructions which when executed cause correlating the fault indication to information from a network management system to determine whether a call manager to which the phone is coupled properly forwarded the message to the messaging server.

19. The method of claim 13, further comprising instructions which when executed cause requesting the messaging system to delete the message, and determining a time elapsed between requesting the messaging system to delete the message and when a message indication at the phone disappears.

20. A computer system comprising:
one or more processors, wherein the one or more processors are configured to couple directly or indirectly through one or more networks to a first agent acting as proxy for an Internet Protocol (IP) phone;
a computer-readable volatile or non-volatile medium coupled to the one or more processors and storing one or more sequences of instructions which when executed by the one or more processors cause:
as a second agent that is registered with a unified messaging system, receiving a message from the first agent;
forwarding the message to the unified messaging system;
creating and storing in the computer system a copy of the message;
in response to receiving a message notification from the messaging system, accessing a message repository of the messaging system and retrieving the message from the message repository;
comparing the message retrieved from the message repository with the copy of the message; and
based on the comparing, determining whether the message retrieved from the message repository is degraded in quality.

21. The system of claim 20, wherein the computer-readable volatile or non-volatile medium further comprises instructions which when executed cause determining how much time elapses between arrival of the message and activation of a message waiting indicator at the phone.

22. The system of claim 20, wherein the message is an audio message and wherein the computer-readable volatile or non-volatile medium further comprises instructions which when executed cause playing the message using an interface to the messaging system, upon retrieving the message.

23. The system of claim 20, wherein the computer-readable volatile or non-volatile medium further comprises instructions which when executed cause determining why the message retrieved from the repository is degraded.

24. The system of claim 20, wherein the message is any of an audio message, an e-mail message, and a facsimile message.

25. The system of claim 20, wherein the computer-readable volatile or non-volatile medium further comprises instructions which when executed cause multicasting the message to a plurality of telephony endpoints on a network, and determining, by each of a plurality of agents that are each associated with a respective endpoint of the plurality of endpoints, whether the associated endpoint receives a message notification in response to the message.

26. A non-transitory computer-readable volatile or non-volatile medium storing one or more sequences of instructions which, when executed by one or more processors, cause the one or more processors to perform:
   receiving at an endpoint in a network, a message from a first agent acting as proxy for an Internet Protocol (IP) phone;
   forwarding the message to a unified messaging system;
   creating and storing at the endpoint, a copy of the message;
   in response to receiving a message notification at the endpoint from the messaging system, accessing a message repository of the messaging system and retrieving the message from the message repository;
   comparing the message retrieved from the message repository with the copy of the message; and
   based on the comparing, determining whether the message retrieved from the message repository is degraded in quality.

27. The computer-readable volatile or non-volatile medium of claim 26, further comprising instructions which when executed cause determining how much time elapses between arrival of the message at the endpoint and activation of a message waiting indicator at the phone.

28. The computer-readable volatile or non-volatile medium of claim 26, further comprising instructions which when executed cause playing the message using an interface to the messaging system, upon retrieving the message.

29. The computer-readable volatile or non-volatile medium of claim 26, further comprising instructions which when executed cause determining why the message retrieved from the repository is degraded.

30. The computer-readable volatile or non-volatile medium of claim 26, wherein the message is any of an audio message, an e-mail message, and a facsimile message.

31. The computer-readable volatile or non-volatile medium of claim 26, further comprising instructions which when executed cause multicasting the message to a plurality of telephony endpoints on a network, and determining, by each of a plurality of agents that are each associated with a respective endpoint of the plurality of endpoints, whether the associated endpoint receives a message notification in response to the message.

32. The computer-readable volatile or non-volatile medium of claim 26, further comprising instructions which when executed cause testing whether the message notification is received at the endpoint from the messaging system in response to the forwarding, and generating a fault indication when the message notification is not received at the endpoint.

33. The computer-readable volatile or non-volatile medium of claim 32, further comprising instructions which when executed cause correlating the fault indication to information from a network management system to determine whether a call manager to which the phone is coupled properly forwarded the message to the messaging server.

34. The computer-readable volatile or non-volatile medium of claim 26, further comprising instructions which when executed cause testing, in response to the retrieving, whether the messaging system properly received, processed, stored and made available the forwarded message associated with the phone, and generating a fault indication when the message cannot be retrieved.

35. The computer-readable volatile or non-volatile medium of claim 34, further comprising instructions which when executed cause correlating the fault indication to information from a network management system.

36. The computer-readable volatile or non-volatile medium of claim 26, further comprising instructions which when executed cause correlating the fault indication to information from a network management system to determine whether a call manager to which the phone is coupled properly forwarded the message to the messaging server.

37. The computer-readable volatile or non-volatile medium of claim 26, further comprising instructions which when executed cause requesting the messaging system to delete the message, and determining a time elapsed between requesting the messaging system to delete the message and when a message indication at the phone disappears.

* * * * *